(12) United States Patent
Suzuki et al.

(10) Patent No.: US 10,510,275 B2
(45) Date of Patent: Dec. 17, 2019

(54) DISPLAY DEVICE AND DISPLAY DEVICE ACCESSORY

(71) Applicants: NURVE, Inc., Tokyo (JP); aete Co., Ltd., Tokyo (JP)

(72) Inventors: Ken Suzuki, Tokyo (JP); Hideki Tada, Tokyo (JP)

(73) Assignee: NURVE, Inc., Tokyo (JP)

( * ) Notice: Subject to any disclaimer, the term of this patent is extended or adjusted under 35 U.S.C. 154(b) by 0 days.

(21) Appl. No.: 16/152,630

(22) Filed: Oct. 5, 2018

(65) Prior Publication Data

US 2019/0035313 A1 Jan. 31, 2019

Related U.S. Application Data

(63) Continuation of application No. PCT/JP2017/013242, filed on Mar. 30, 2017.

(30) Foreign Application Priority Data

Apr. 6, 2016 (JP) .................. 2016-076818

(51) Int. Cl.
*G09G 5/00* (2006.01)
*G02B 27/01* (2006.01)
(Continued)

(52) U.S. Cl.
CPC ......... *G09G 3/001* (2013.01); *G02B 27/2242* (2013.01); *G06F 3/041* (2013.01);
(Continued)

(58) Field of Classification Search
CPC . G02B 27/01; G06F 3/03; G06F 3/044; G06F 1/16; G09G 5/00
See application file for complete search history.

(56) References Cited

U.S. PATENT DOCUMENTS

| | | | |
|---|---|---|---|
| 6,346,929 B1* | 2/2002 | Fukushima | ............. G06F 3/013 345/156 |
| 2012/0002046 A1* | 1/2012 | Rapoport | .................. A42B 3/04 348/143 |

(Continued)

FOREIGN PATENT DOCUMENTS

| | | |
|---|---|---|
| JP | 2010-273027 A | 12/2010 |
| JP | 2015-106915 A | 6/2015 |
| WO | 2015/126987 A1 | 8/2015 |

OTHER PUBLICATIONS

International Search Report issued in PCT/JP2017/013242 dated Jun. 20, 2017 with English Translation (3 pages).

(Continued)

*Primary Examiner* — Pegeman Karimi
(74) *Attorney, Agent, or Firm* — Nakanishi IP Associates, LLC

(57) ABSTRACT

A display device includes: a housing that has a space formed therein, the space opening at two end faces that are opposed to each other; two lenses that are placed in the space; and a display part that has a display panel and is placed on the side of one of the two end faces. The display part can be switched between a first state in which the display panel is exposed to the exterior of the housing and a second state in which the display panel faces toward the interior of the housing.

16 Claims, 20 Drawing Sheets

(51) Int. Cl.
  *G09G 3/00* (2006.01)
  *G09F 9/00* (2006.01)
  *G02B 27/22* (2018.01)
  *G06F 3/041* (2006.01)
  *H04N 13/00* (2018.01)
  *H05K 5/00* (2006.01)

(52) U.S. Cl.
  CPC .............. *G09F 9/00* (2013.01); *H04N 13/00* (2013.01); *H05K 5/0017* (2013.01); *G09G 2320/10* (2013.01); *G09G 2354/00* (2013.01)

(56) References Cited

U.S. PATENT DOCUMENTS

| | | | | |
|---|---|---|---|---|
| 2015/0234189 A1* | 8/2015 | Lyons | ............... | G02B 27/0172 345/174 |
| 2015/0346811 A1* | 12/2015 | Tanaka | ................. | G06F 3/012 345/156 |
| 2016/0018853 A1* | 1/2016 | Buckley | ............. | G02B 27/0176 345/174 |
| 2016/0062117 A1* | 3/2016 | Imasaka | ............. | G02B 27/0101 345/7 |
| 2016/0062125 A1* | 3/2016 | Baek | .................. | G02B 27/0176 361/679.01 |
| 2016/0063919 A1* | 3/2016 | Ha | ....................... | G02B 27/017 345/156 |
| 2017/0078622 A1* | 3/2017 | Donato | .............. | G02B 27/0176 |
| 2018/0033050 A1* | 2/2018 | Jung | .................. | G06Q 30/0267 |

OTHER PUBLICATIONS

Written Opinion of International Searching Authority issued in PCT/JP2017/013242 dated Jun. 20, 2017 (5 pages).

Sumaho o Shuno Shite Tsukau Head Mount Display, 1600-en de Hatsubai, Ketai Watch, Impress Corp., Jan. 22, 2015, Internet: <URL: http://k-tai.watch.impress.co.jp/docs/news/684972.html>, with English Translation (6 pages).

International Preliminary Report on Patentability (Chapter II of PCT: IPER) issued in PCT/JP2017/013242 dated May 4, 2018 with English Translation (8 pages).

* cited by examiner

DISPLAY DEVICE AND DISPLAY DEVICE ACCESSORY

CROSS-REFERENCE TO RELATED APPLICATION(S)

This application is a continuation application of PCT international application No. PCT JP2017/013242, filed on Mar. 30, 2017, which designated the United States, and which claims the benefit of priority from Japanese Patent Application No. 2016-76818, filed on Apr. 6, 2016. The entire contents of these applications are incorporated herein by reference.

BACKGROUND OF THE INVENTION

Field of the Invention

The present invention relates to a display device and a display device accessory, and in particular, to a display device and a display device accessory usable for viewing virtual reality content and the like.

Description of the Related Art

Display devices, so-called head-mounted displays, worn and used on the heads of users are used in various fields, including games and entertainment. Head-mounted displays are either spectacle-type or goggle-type devices having a display panel (video display part) and a lens embedded therein (see, for example, JP2010-273027 A). Users can enjoy viewing images (still images and animation) with a stereoscopic effect by looking at the display panel through the lens.

In conventional head-mounted displays, the image data of an image to be displayed on the display panel is transmitted from external equipment, such as a personal computer or the like, via wired or wireless communication lines or communication cables and is input to the head-mounted displays. In addition, operations, such as starting and quitting the image display, may be performed from the external equipment.

More recently, a technology has become known in which portable equipment having an image display function, such as a smartphone, is mounted to a goggle-type housing and the resultant combination is used as a head-mounted display (see, for example, JP2015-106915 A). In this case, the user can cause images to be displayed by having image data stored on the smartphone in advance without using external equipment, such as a personal computer or the like.

BRIEF SUMMARY OF THE INVENTION

An aspect of the present invention relates to a display device. The display device includes: a housing that has a space formed therein, the space opening at two end faces that are opposed to each other; two lenses that are placed in the space; and a display part that has a display panel and placed on the side of one of the two end faces, wherein the display part is switchable between a first state in which the display panel is exposed to the exterior of the housing and a second state in which the display panel faces toward the interior of the housing by reversing the orientation of the display part with respect to the housing.

Another aspect of the present invention relates to a display device accessory. The display device accessory comprises: a housing that has a space formed therein, the space opening at two end faces that are opposed to each other; two lenses that are placed in the space; and a connection part that is placed on the side of one of the two end faces and that directly or indirectly connects an image display device to the housing, the image display device having a display panel that is capable of displaying an image, wherein, while the image display device is directly or indirectly connected to the housing by the connection part, a first state in which the display panel is exposed to the exterior of the housing and a second state in which the display panel faces the interior of the housing by reversing the orientation of the display part with respect to the housing.

The above-described, or other features, advantages and technical and industrial significance of the present invention, will be better understood by reading the following detailed description of the preferred embodiments of the present invention while considering the attached drawings.

DETAILED DESCRIPTION OF THE INVENTION

Figure 1:
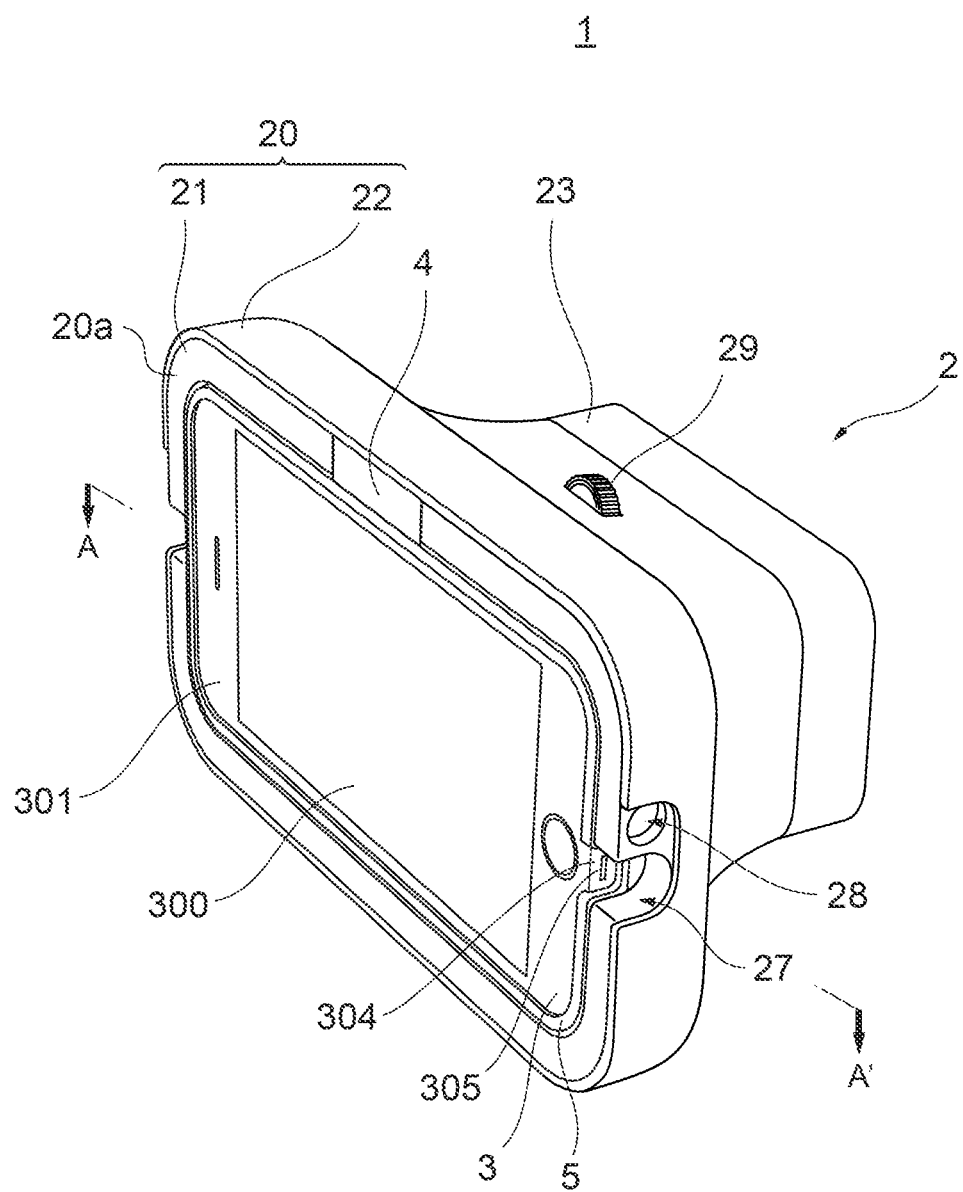
FIG. 1 is a perspective view showing a display device according to an embodiment of the present invention.

The display device according to embodiments of the present invention will be described hereinafter with reference to the drawings. It should be noted that the present invention is not limited by these embodiments. In addition, the same reference numerals are given to identical parts in the descriptions of the respective drawings.

Furthermore, the drawings to which reference is made in the following description merely schematically indicate the shape, size and positional relationship to an extent sufficient to understand the content of the present invention. In other words, the present invention is not limited only to the shape, size and positional relationship illustrated in the respective drawings.

Embodiment

Figure 2:
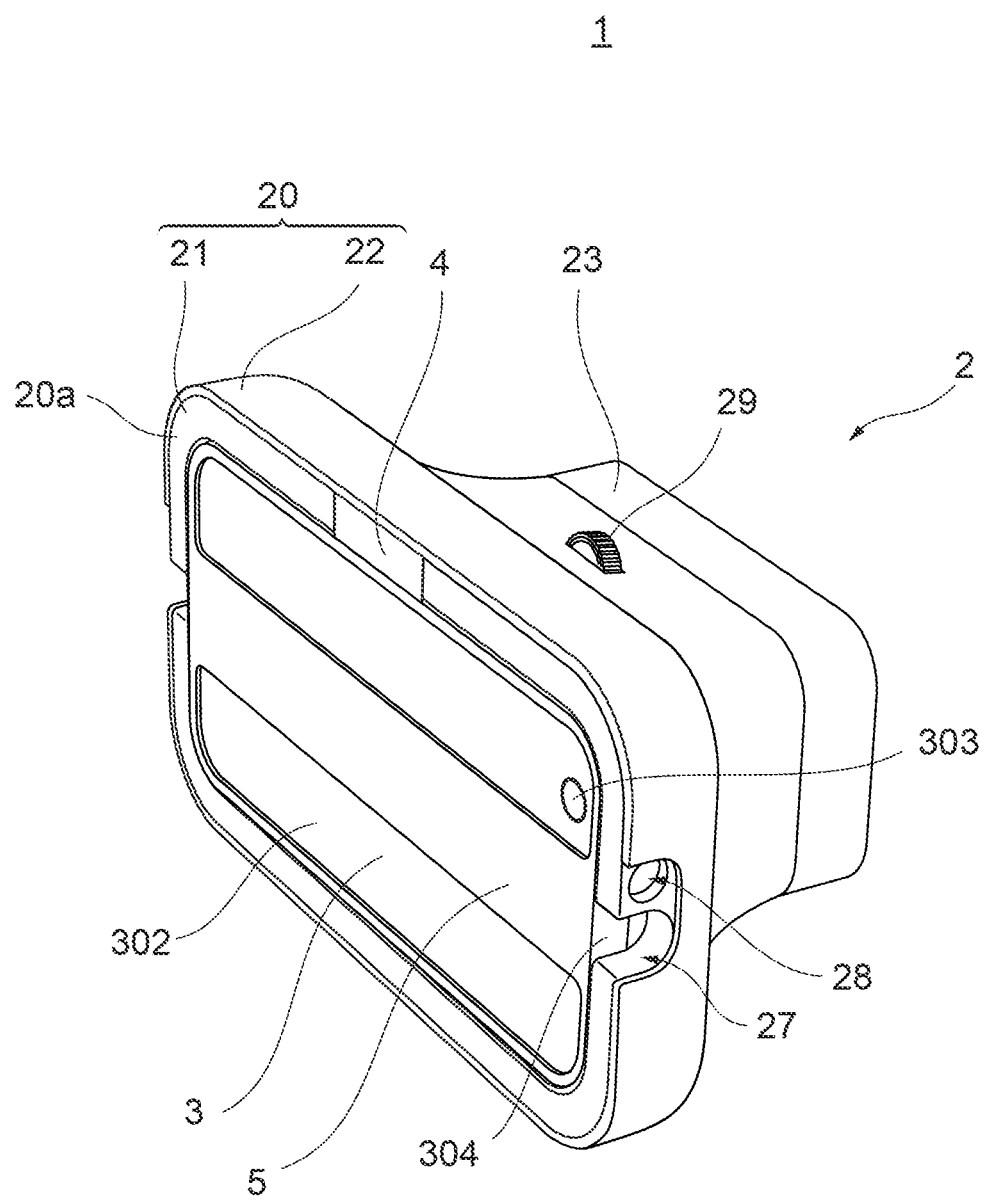
FIG. 2 is another perspective view showing the display device according to the embodiment.
Figure 3:
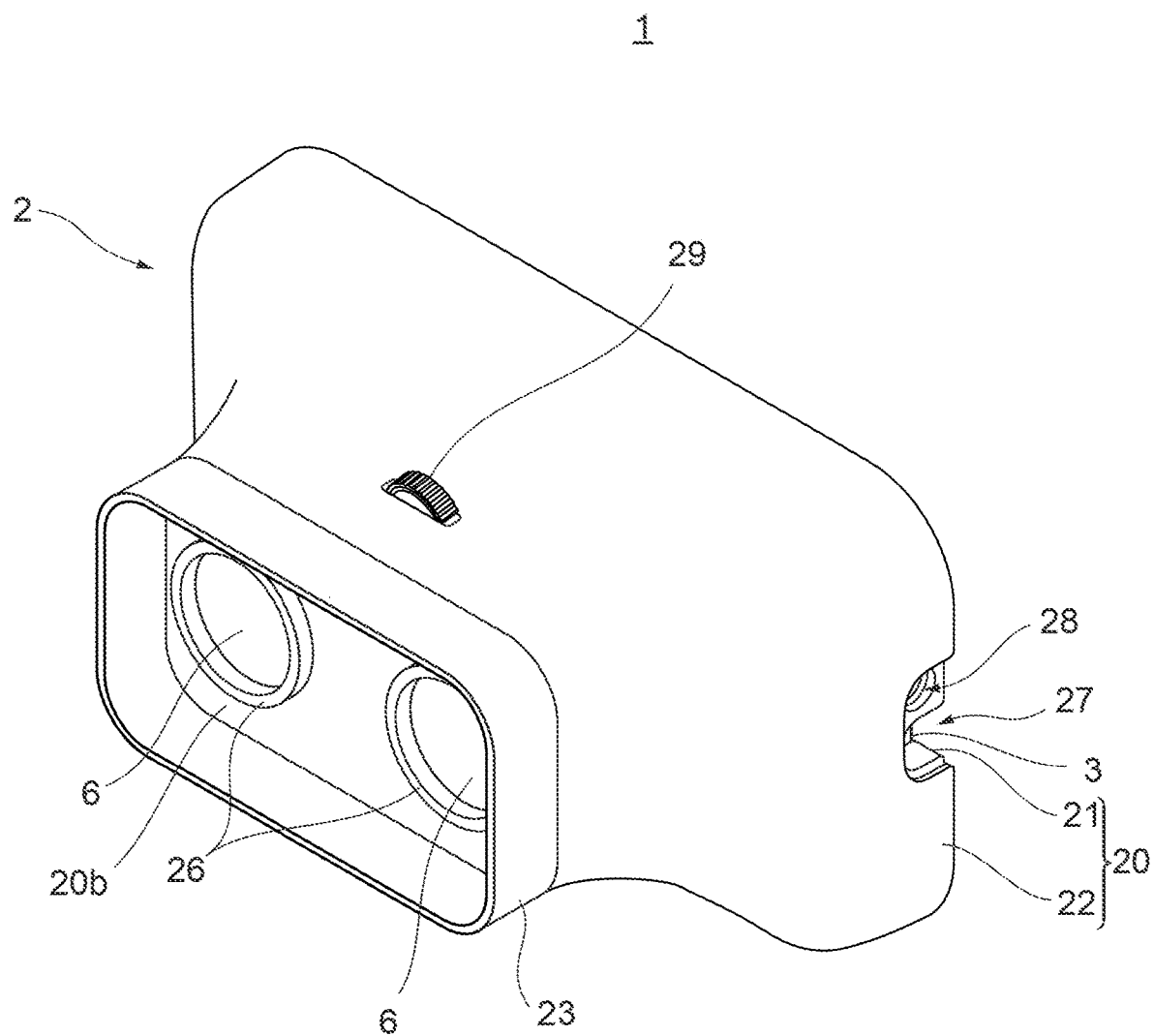
FIG. 3 is another perspective view showing the display device according to the embodiment.
Figure 4:
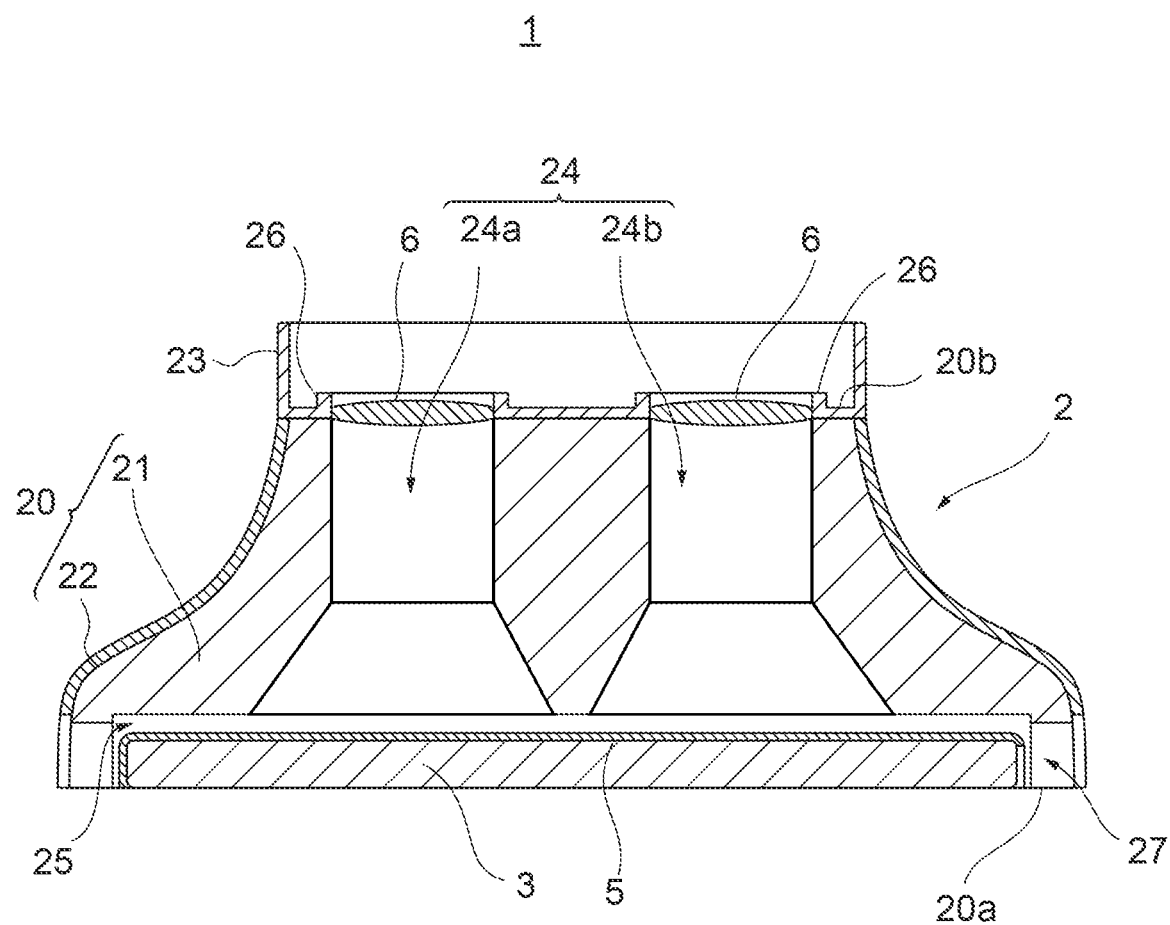
FIG. 4 is a cross-sectional view through line A-A' in FIG. 1.

Each of FIGS. 1 to 3 is a perspective view showing a display device according to an embodiment of the present invention. FIG. 4 is a cross-sectional view through line A-A' in FIG. 1. As shown in FIGS. 1 to 4, the display device 1 according to the present embodiment is provided with: a housing 2; an image display device 3 having a display part including a display panel 300 on which images and the like are displayed; and a connection part 4 that connects the image display device 3 to the housing 2. In the present embodiment, a retention part 5 is attached to the connection part 4 and this retention part 5 retains the image display device 3; however, the image display device 3 may be directly attached to the connection part 4.

The connection part 4 connects the image display device 3 to the housing 2 such that the device is switchable between the state in which the display panel 300 is exposed to the exterior of the housing 2 (the first state) and the state in which the display panel 300 is facing toward the interior of the housing 2 (the second state). FIG. 1 shows the state in which the display panel 300 is exposed by facing the display panel 300 outward from the housing 2 and FIG. 2 shows the state in which the display panel 300 is facing inward toward the housing 2. FIG. 3 shows the state in which the display device 1 is seen from the back side. It should be noted that the diagrammatic representation of the interior mechanism of the image display device 3 is omitted in FIG. 4.

The housing 2 includes: a main body part 20 with two end faces 20a, 20b opposed to each other; and a face-touching part 23 provided on the one end face 20b side of the main body part 20. The main body part 20 includes a thick internal member 21 and a coating member 22 that covers the outside of the internal member 21. The material forming the respective parts of the main body part 20 and the face-touching part 23 is not particularly limited; however, a resin material is used in the present embodiment and these respective parts are integrally formed by mold injection art. The internal member 21, the coating member 22 and the face-touching part 23 may be made from respectively different resin materials or from the same resin material. In the former case, for example, the materials may be selected such that the internal member 21 may be made from high-strength rigid plastic, the coating member 22 may be made from flexible plastic having a smooth texture with a certain degree of elasticity, and the face-touching part 23 may be made from flexible plastic with a high elasticity. Moreover, designability may be provided to the display device 1 by varying the colors of the materials to be used for the respective parts. Needless to say, the internal member 21, the coating member 22 and the face-touching part 23 may be made from the same material, or part or all of the parts may be made from a material other than the resin material.

The face-touching part 23 is the part with which the user's face makes contact when he/she looks into the interior of the housing 2. The shape of the end face of the face-touching part 23 is rectangular with rounded corners in the present embodiment (see FIG. 3); however, the shape of the face-touching part 23 is not limited thereto. For example, a nose-touching part may be provided by inwardly bending part of the face-touching part 23. In addition, the end face of the face-touching part 23 may be bent according to the shape of the user's forehead or cheeks.

A space 24 is formed in the main body part 20, which opens at the two end faces 20a, 20b. The space 24 is partitioned into two regions 24a, 24b so that regions can be respectively looked into by right and left eyes. A lens 6 is fitted into each region 24a, 24b. In addition, a tubular lens frame 26 is provided at an end part of each region 24a, 24b on the end face 20b side. The positions of the two lenses 6 and the lens frames 26 are fixed in the present embodiment; however, a mechanism for adjusting the distance between these lenses 6 and the lens frames 26 may further be provided.

It should be noted that the space 24 is completely partitioned into two regions 24a, 24b in the present embodiment; however, it is not necessary to completely partition the space. For example, an integral space sufficient to cover the two regions 24a, 24b may be formed in the housing 2 and the partitioning into two regions may be made by providing a partition plate in this space. In such case, the partition plate may or may not reach the end part of the space. In short, it is sufficient as long as the fields of view of the right and left eyes are blocked from each other such that the region to be seen with the right eye and the region to be seen with the left eye are not mixed when the interior of the space is seen with the right and left eyes through the two lenses 6.

A concave part 25 for placing the image display device 3 therein is formed in the end face 20a of the main body part 20. When the image display device 3 is placed in the concave part 25, the space 24 is shielded on the end face 20a side and light entry into the space 24 from the end face 20a side can be suppressed.

A cutout 27 is provided in a side of the housing 2 on the end face 20a side. This cutout 27 is used for pulling the image display device 3 together with the retention part 5 by the user inserting his/her finger therein when switching the orientation of the display panel 300. In addition, a strap fastener 28 is provided in the neighborhood of the cutout 27 for attaching a strap or a band to the display device 1. A dial 29 may further be provided on the housing 2 for adjusting the foci of the lenses 6.

The image display device 3 is a compact device provided with a display with a touch-sensitive function. A dedicated display device for the display device 1 may be used for the image display device 3, or a general-purpose device provided with a display, such as a smartphone, personal digital assistant (PDA), portable gaming device or the like may be used therefor. A general-purpose smartphone is used as the image display device 3 in the present embodiment.

The display panel 300 is provided on one of the main surfaces (surface 301) of the image display device 3. The display panel 300 is formed by a liquid crystal or organic EL (electroluminescence) and is provided with a touch sensor, as described hereinafter.

A camera lens 303 is provided on the other of the main surfaces (back surface 302) of the image display device 3. In addition to the images, the image data of which is stored in memory in advance, the image display device 3 may display images that are captured in real time via the camera lens 303.

In addition, a cable terminal 305 is provided on a side 304 of the image display device 3 for performing data transmission/reception and charging.

Figure 5:
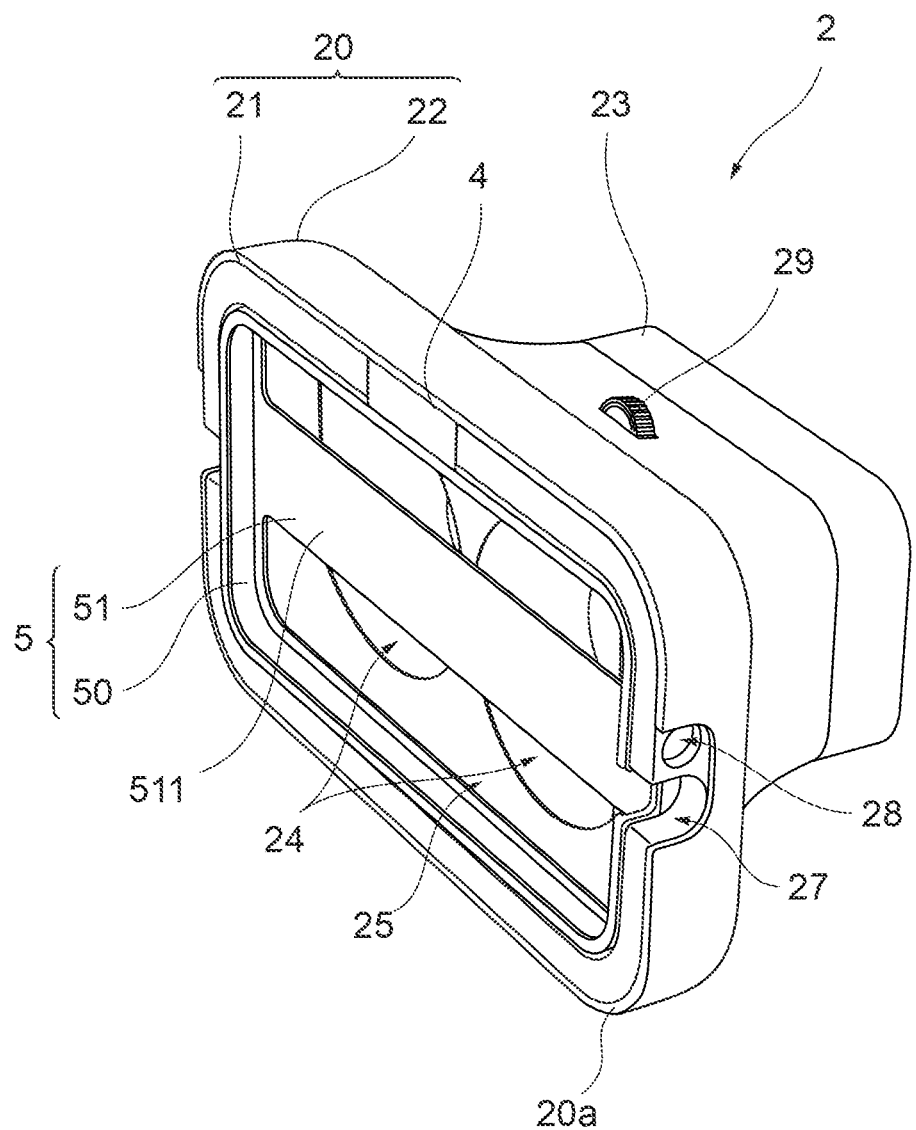
FIG. 5 is a perspective view showing the state in which an image display device is removed from the display device shown in FIG. 1.
Figure 6:
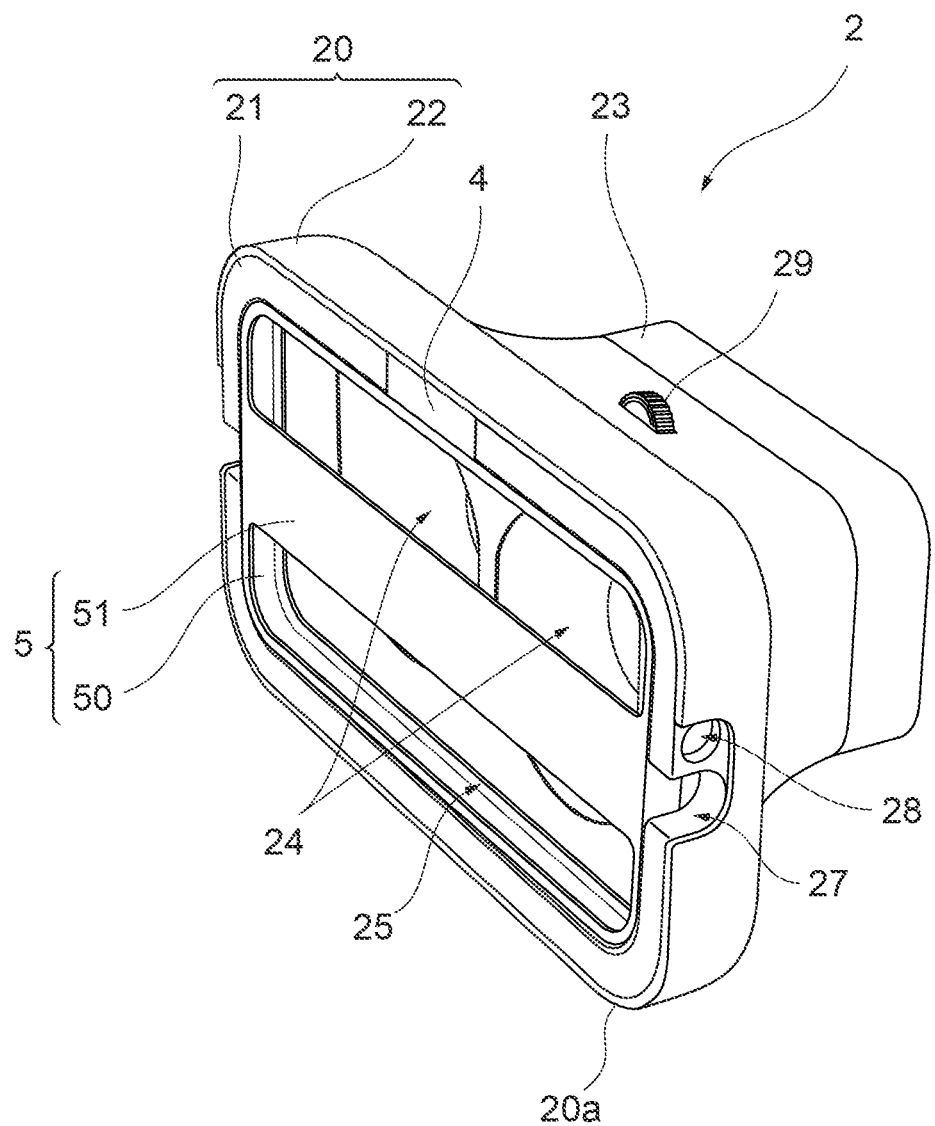
FIG. 6 is a perspective view showing the state in which an image display device is removed from the display device shown in FIG. 2.

FIG. 5 is a perspective view showing the state in which the image display device 3 is removed from the display device 1 shown in FIG. 1. FIG. 6 is a perspective view showing the state in which the image display device 3 is removed from the display device 1 shown in FIG. 2. The retention part 5 has a frame body 50 that clamps the side 304 of the image display device 3 and a bottom plate 51 that connects to at least part of the frame body 50, and retains the image display device 3 such that the display panel 300 is exposed. The retention part 5 is attached to the connection part 4 at part of the frame body 50.

When retaining the image display device 3, the image display device 3 is fitted into the retention part 5 such that the back surface 302 (see FIG. 2) of the image display device 3 abuts on the surface 511 (see FIG. 5) of the bottom plate 51. It becomes possible to use a general-purpose device, such as a smartphone, as the image display device 3 by attaching the image display device 3 to the connection part 4 via such retention part 5.

Figure 7:
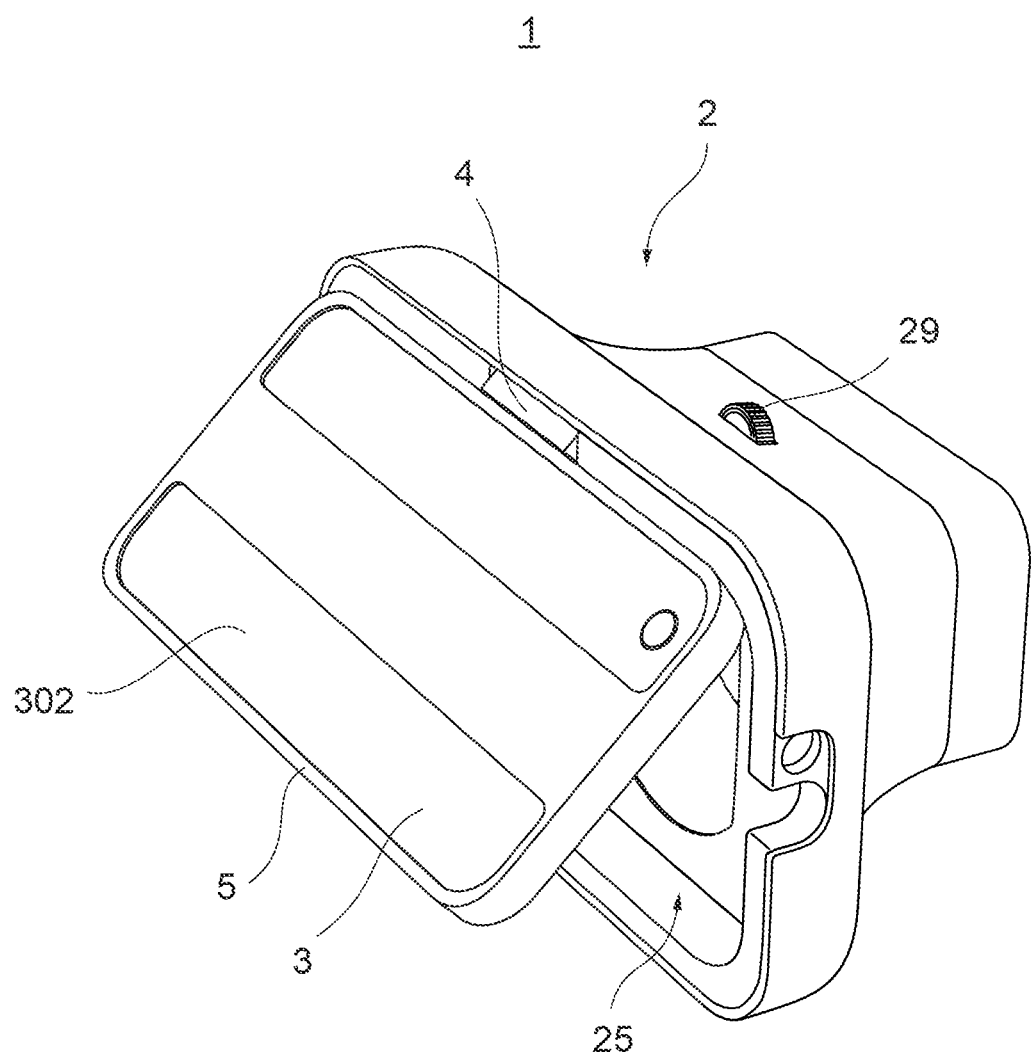
FIG. 7 is a perspective view showing the condition in which the orientation of a display panel is varied.
Figure 8:
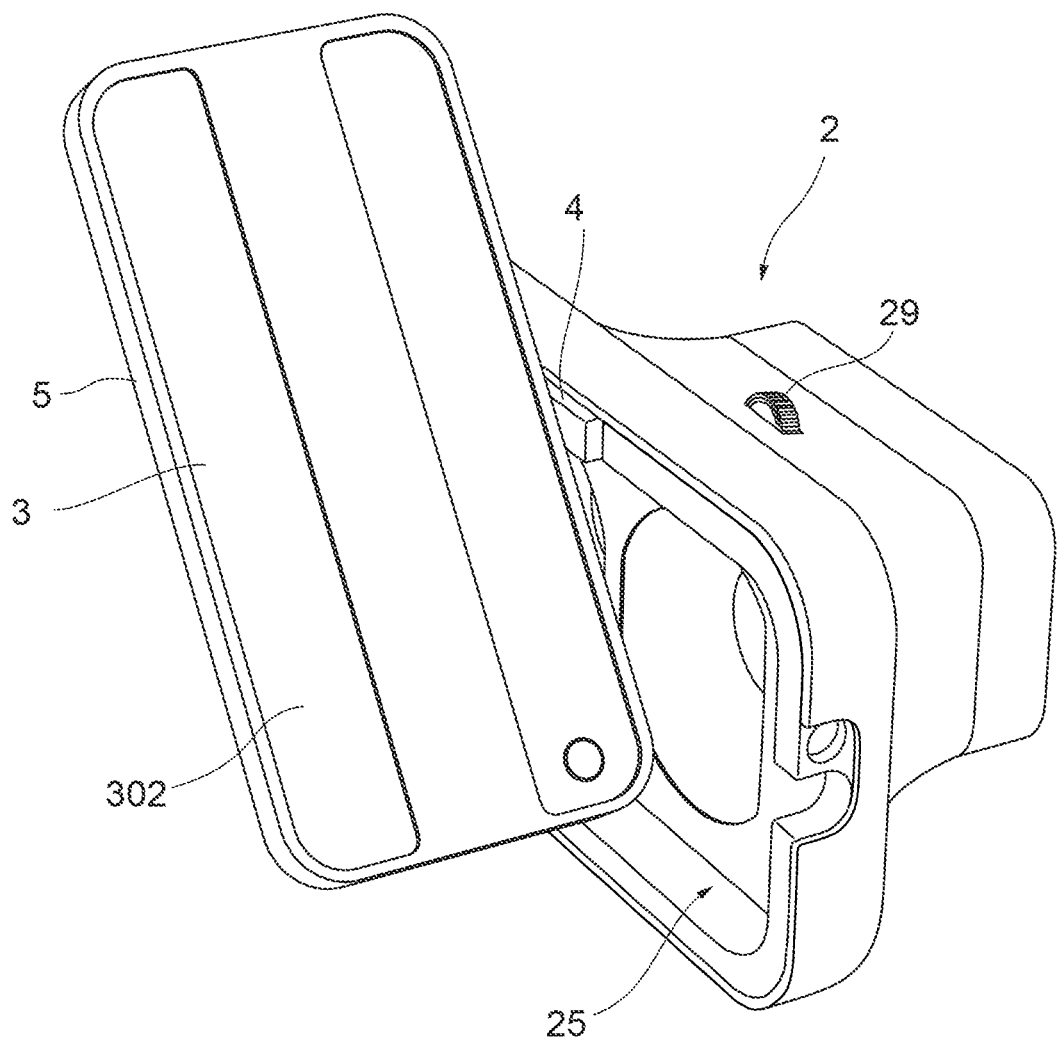
FIG. 8 is a perspective view showing the condition in which the orientation of a display panel is varied.

Each of FIGS. 7 and 8 is a perspective view showing the condition in which the image display device 3 is rotated and the orientation of the display panel 300 is varied. The configuration of the connection part 4 is not particularly limited and a biaxial hinge is used as the connection part 4 in the present embodiment. As shown in FIGS. 7 and 8, the orientation (outward or inward) of the display panel 300 can be easily reversed by rotating the image display device 3 around two axes, i.e. an axis parallel to the longitudinal direction of the image display device 3 and an axis orthogonal to such longitudinal direction.

Figure 9:
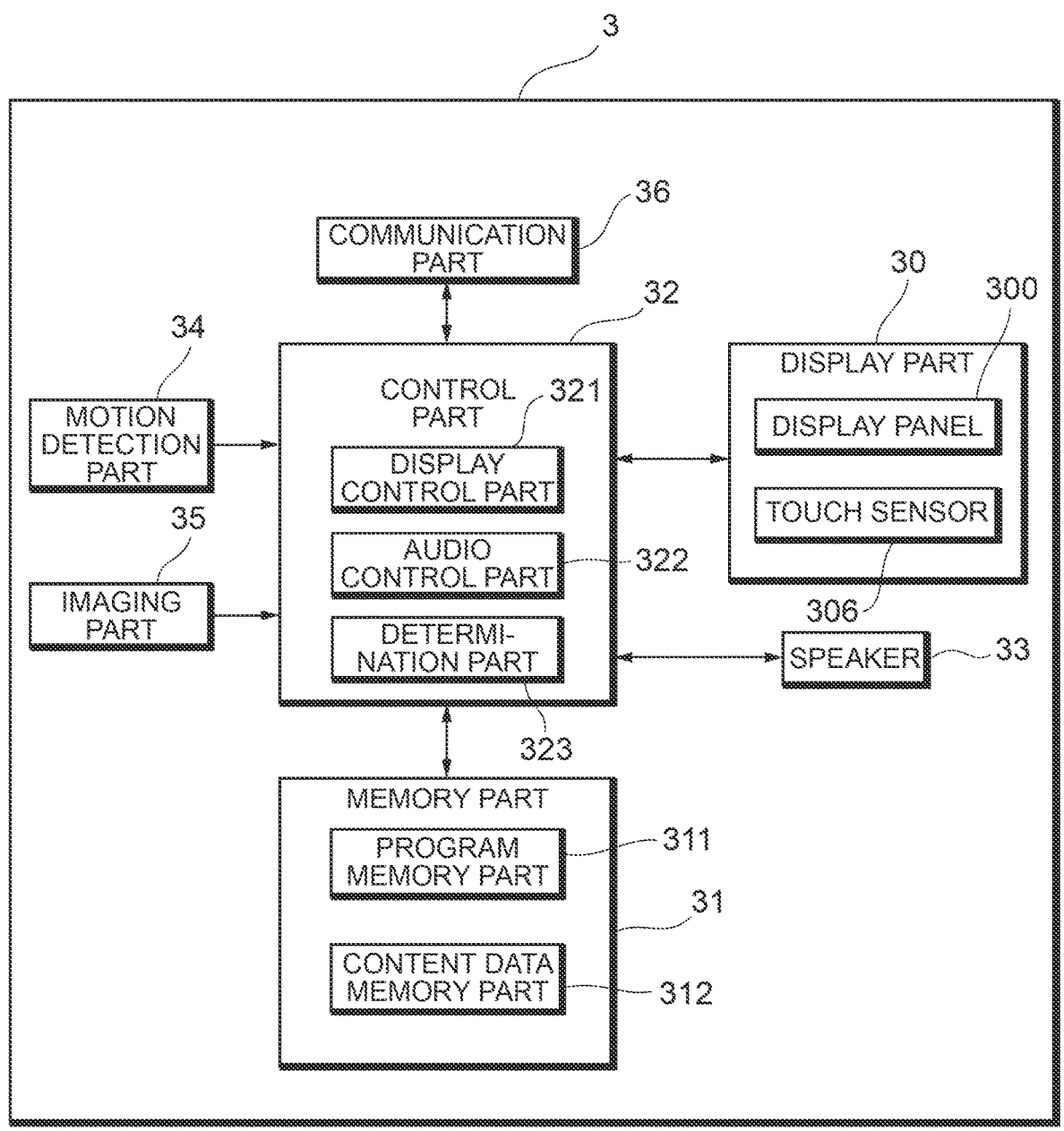
FIG. 9 is a block diagram showing the schematic functional configuration of the display device shown in FIG. 1.
Figure 10:
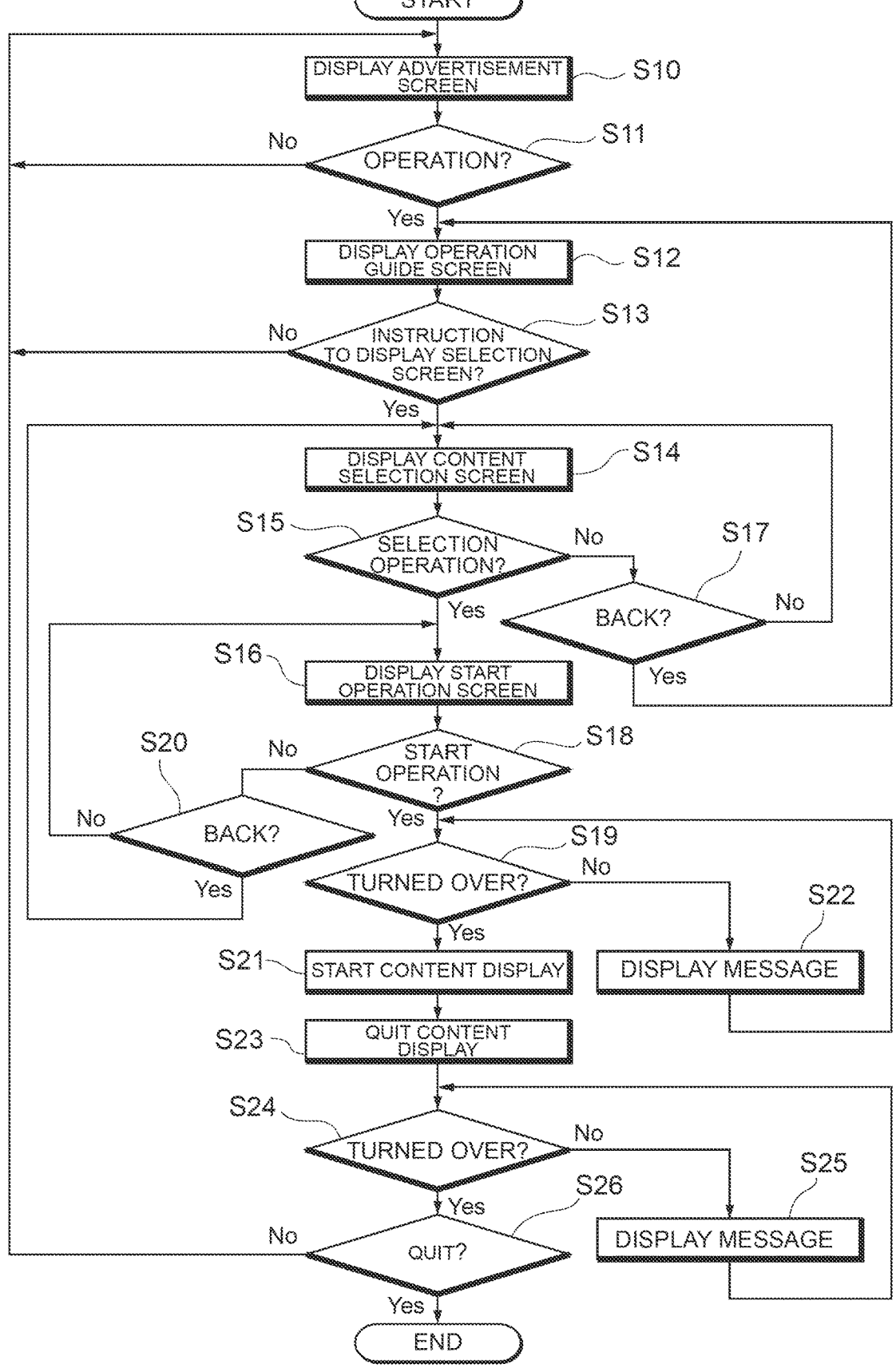
FIG. 10 is a flowchart showing an example of operations of the display device according to the embodiment.

FIG. 9 is a block diagram showing the schematic functional configuration of the image display device 3. As shown in FIG. 9, the image display device 3 is provided with a display part 30, a memory part 31, a control part 32, a speaker 33, a motion detection part 34, an imaging part 35 and a communication part 36. Among these, the speaker 33, the motion detection part 34, the imaging part 35 and the communication part 36 are optional and provided according to the applications and functions of the device, such as a smartphone, used as the image display device 3.

The display part 30 includes the display panel 300 and a touch sensor 306 that outputs signals according to the operations made to the display panel 300. The display part 30 displays images and various types of information on the display panel 300 under the control of the control part 32 and inputs the signals output from the touch sensor 306 to the control part 32.

The memory part 31 is a computer-readable memory medium, such as semiconductor memory including, for example, a ROM and a RAM. The memory part 31 includes a program memory part 311 that stores, in addition to an operating system program and a driver program, application programs for running various functions and the like and a content data memory part 312 that stores image data of images to be displayed by the display part 30, audio data of sound to be output along the images, and various types of data to be used during execution of the above-described programs.

The control part 32 is configured using, for example, a CPU (Central Processing Unit), and controls the respective parts of the image displace device 3 in an organized manner by reading the various programs stored in the program memory part 311 and causes the display part 30 to display images according to the orientation of the display panel 300 and the signals input from the touch sensor 306.

Specifically, the control part 32 includes a display control part 321, an audio control part 322 and a determination part 323. The display control part 321 determines an image to be displayed on the display panel 300, acquires the image data of such image from the content data memory part 312 and outputs the same to the display part 30. The audio control part 322 acquires audio data of sound to be generated simultaneously with the image display from the content data memory part 312 and outputs the same to the speaker 33. The determination part 323 determines the orientation of the display panel 300 and outputs the determination result to the display control part 321. This determination result is used for the image determination in the display control part 321. The method of determining the orientation of the display panel 300 will be described hereinafter.

The speaker 33 generates sound based on the audio data output from the control part 32.

The motion detection part 34 includes, for example, a gyroscope sensor and an acceleration sensor embedded in the image display device 3 and detects rotational movement of the image display device 3.

The imaging part 35 includes an imaging element, such as a CCD (Charge Coupled Device), a CMOS (Complementary MOS), or the like, and performs imaging by detecting light entering the camera lens 303.

The communication part 36 is an interface for communicating with other devices and transmitting/receiving information via wired or wireless communication lines. The display control part 321 may acquire the image data of the images to be displayed on the display panel 300 from the content data memory part 312 or via the communication part 36.

Next, the method for determining the orientation of the display panel 300 by the determination part 323 will be described. Various methods can be conceived of for the method of determining the orientation of the display panel 300; however, a determination method using functions provided to the image display device 3 will be described in the present embodiment.

As an example, the orientation of the display panel 300 can be determined based on the detection result of the motion detection part 34. Specifically, as shown in FIGS. 7 and 8, when the motion detection part 34 detects that the image display device 3 has performed the rotational movement around two axes, the determination part 323 determines that the orientation of the display panel 300 is reversed.

As another example, the orientation of the display panel 300 may be determined based on a light amount of light detected by the imaging part 35. More particularly, when the display panel 300 is facing outward, the camera lens 303 faces the bottom surface of the concave part 25 of the housing 2. The determination part 323 then determines that the display panel 300 is facing outward when the light amount of light detected by the imaging part 35 is below a predetermined value and that the display panel 300 is facing inward when such light amount is equal to or greater than the predetermined value.

It should be noted that, instead of the imaging part 35, a light detector with only a light detection function may be provided. In such case, the light detector may be provided on either of the two main surfaces (i.e. the surface 301 or the back surface 302) of the image display device 3. If the light detector is provided on the surface 301, namely, on the same side as the display panel 300, the display panel 300 is determined to be facing inward when the light amount of the detected light is below the predetermined value. On the other hand, if the light detector is provided on the back surface 302, namely, on the opposite side to the display panel 300, the display panel 300 is determined to be facing inward when the light amount of the detected light is equal to or greater than the predetermined value.

In such display device 1, a user-requested image may be displayed on the display panel 300 through touch operations on the display panel 300. The image data of the image to be displayed on the display panel 300 may be data stored in the memory part 31 or data delivered via communication networks (so-called streaming delivery).

The types of images to be displayed on the display panel 300 are not particularly limited. For example, a 2D image (two-dimensional image) may be displayed while the display panel 300 is facing outward. Additionally, an image that allows stereoscopic viewing (so-called 3D image) by utilizing the parallax effect by looking through the two lenses 6 may be displayed while the display panel 300 is facing inward. In such case, the user can enjoy viewing in virtual reality. When starting to enjoy viewing in virtual reality, the user selects a 3D image to be displayed or inputs an instruction to start displaying the 3D image through touch operations on the display panel 300 while the display panel 300 is facing outward, and thereafter, the display panel 300 may be made to face inward.

In the display device 1, when an operation to select a 3D image or an operation to start displaying the 3D image is performed, the control part 32 may cause the display panel 300 to display an instruction message, for example, "Turn over display panel" before starting to display the image. Additionally, when the display of the 3D image is finished, the control part 32 may cause the display panel 300 to display an instruction message, for example, "End. Turn over display panel."

The timing of starting the display of the 3D image is preferably a predetermined time (for example, from a few seconds to a few dozen seconds) after the timing when, for example, an operation to select a 3D image or an operation to start displaying the 3D image is performed. Alternatively, the display of the 3D image may be started when the determination part 323 determines that the display panel 300 is facing inward. In other words, control of not displaying the 3D image may be performed in the control part 32 when the display panel 300 is facing outward.

The control part 32 may perform control to display an operation screen for accepting inputs through touch operations only when the display panel 300 is facing outward. Alternatively, inputs from the touch sensor 306 may be prevented from being accepted when the display panel 300 is facing inward. In this way, unintended user operation can be prevented from being performed even when an object makes contact with the display panel 300 from inside the housing 2 when the display panel 300 is facing inward.

The display device 1 may be used in various situations by having application programs installed therein in accordance with the intended use. The following example describes a situation where the display device 1 is placed in the front of a store and is utilized for advertising and promotion of commercial products by allowing customers themselves to operate the display device 1. In particular, we shall assume that the display device 1 is placed in the front of a travel agency. In this case, the content data memory part 312 has pre-stored image data for advertising of the travel agency, as well as image data and audio data for allowing customers to experience motion images (videos) of various travel destinations as virtual reality.

Figure 11:
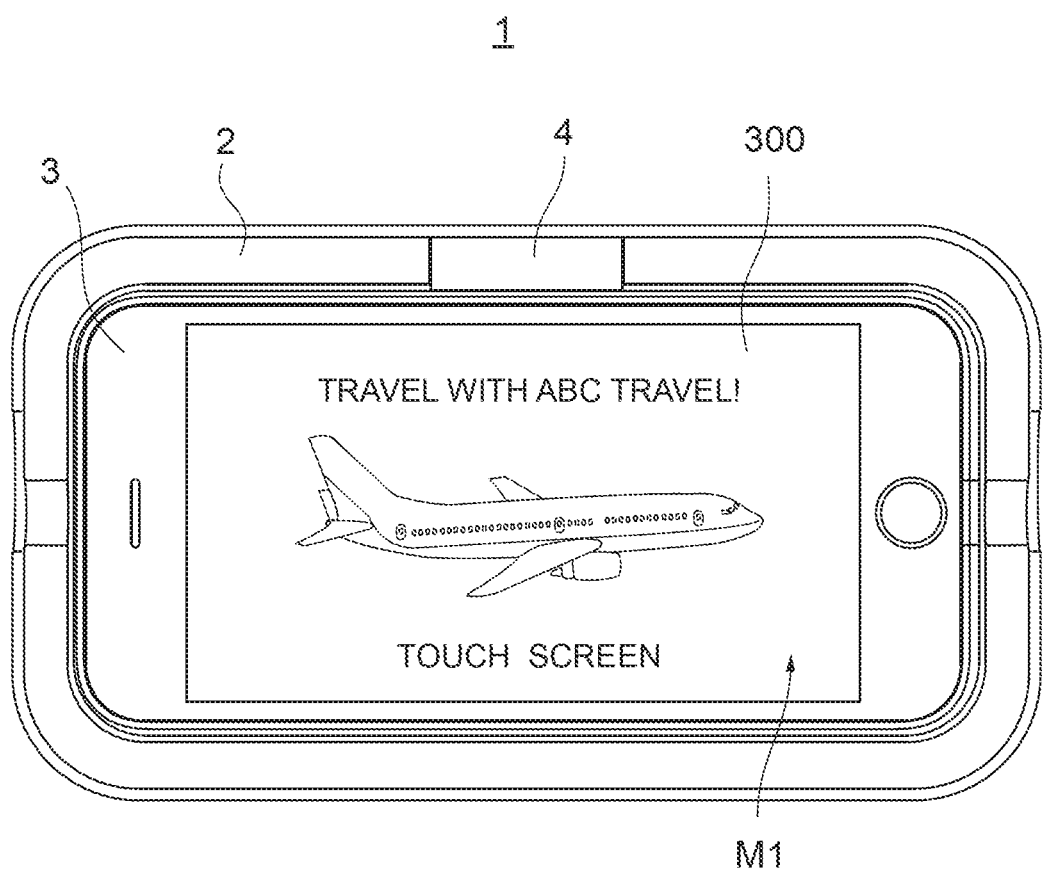
FIG. 11 is a schematic view showing an example of an advertisement screen.

When the operation of the display device 1 is started with the display panel 300 facing outward, the control part 32 acquires the image data for advertising from the content data memory part 312 and outputs the same to the display part 30. Thereby, as shown in FIG. 11, an advertisement screen M1 advertising the travel agency (for example, "ABC Travel") is displayed on the display panel 300 (step S10).

It should be noted that the control part 32 may cause the display panel 300 to display a predetermined advertisement or an advertisement selected from a plurality of advertisements. In the latter case, the control part 32 causes the display panel 300 to display an advertisement selection screen and allows a user (store staff member) to select an advertisement to be displayed through a predetermined operation (for example, a touch operation) on the display panel 300. For example, a plurality of display devices 1 may be placed in one store and each display device 1 may display a different advertisement, such as store information, an advertisement for a certain campaign, customer feedback and the like.

Figure 12:
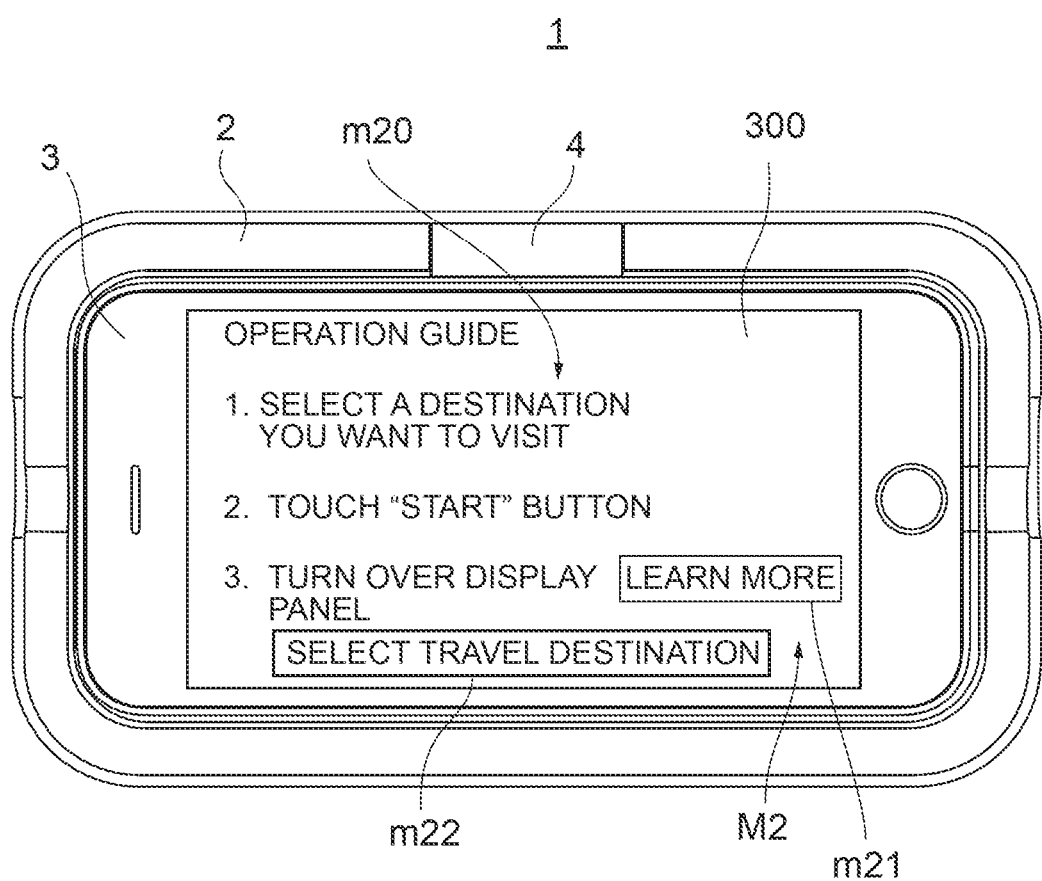
FIG. 12 is a schematic view showing an example of a screen for an operation guide of the display device.

Subsequently, the control part 32 determines whether the predetermined operation has been made on the display panel 300 (step S11). In particular, the control part 32 determines whether a touch operation has been made in any region within the advertisement screen M1. If the predetermined operation has been made (step S11: Yes), the control part 32 causes the display panel 300 to display a screen M2 indicating an operation guide of the display device 1 as shown in FIG. 12 (step S12). On the other hand, if the predetermined operation has not been made (step S11: No), the control part 32 causes the display panel 300 to continuously display the advertisement screen M1 (step S10).

The screen M2 shown in FIG. 12 displays text m20, representing the operation guide, and icons m21, m22 for inputting instructions to make a transition to another screen. When a user (store customer) wants to know more detail about how to reverse the orientation of the display panel 300, the user touches the icon m21 indicating, for example, "Learn More". Thereby, the method of reversing the orientation of the display panel 300 by rotating the image display device 3 (see FIGS. 7 and 8) is displayed on the display panel 300. In addition, when the user wants to display a screen for selecting content (i.e., the travel destination which the user wants to visit), regarding which the user wants to experience virtual reality, the user touches the icon m22 indicating, for example, "Select travel destination."

The control part 32 determines whether the instruction to display the content selection screen has been input (step S13). If the instruction has been input (step S13: Yes), the control part 32 causes the display panel 300 to display the content selection screen M3 shown in FIG. 13 (step S14). On the other hand, if the instruction has not been input (step S13: No), the control part 32 causes the display panel 300 to display the advertisement M1 again after a predetermined time (step S10).

Figure 13:
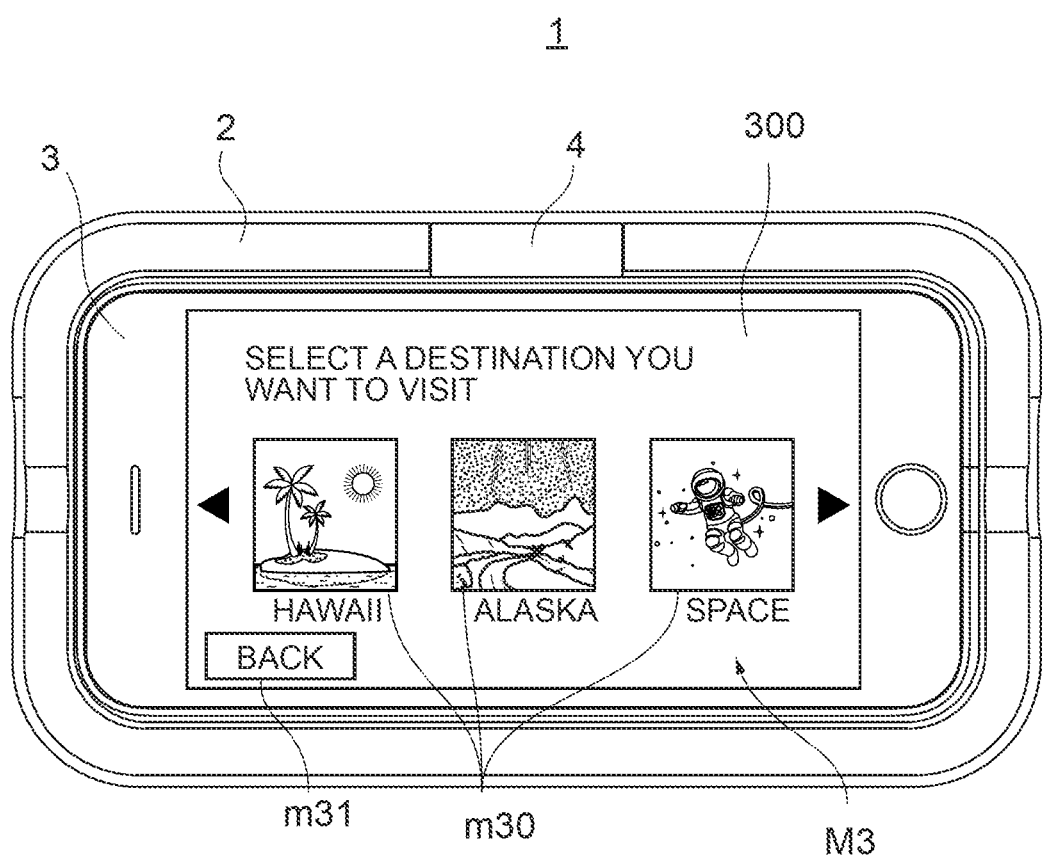
FIG. 13 is a schematic view showing an example of a content selection screen.

The selection screen M3 shown in FIG. 13 displays a plurality of icons m30 for selecting content to be displayed (i.e., the travel destinations in FIG. 13) and an icon m31 for inputting an instruction to go back to the previous screen. The user touches any of the plurality of icons m30 and thereby a travel destination regarding which the user wants to experience virtual reality can be selected. When the user wants to display the operation guide again, the user may simply touch the icon m31.

The control part 32 determines whether a content selection operation has been made (step S15). In particular, the control part 32 determines whether a touch operation has been made on any of the plurality of icons m30. If the selection operation has been made (step S15: Yes), the control part 32 causes the display panel 300 to display a content start operation screen M4 shown in FIG. 14 (step S16). On the other hand, if the selection operation has not been made (step S15: No), the control part 32 further determines whether an instruction to go back to the previous screen has been input (step S17). If the instruction to go back to the previous screen has been input (step S17: Yes), the control part 32 causes the display panel 300 to display the operation guide screen M2 shown in FIG. 12 again (step S12). On the other hand, if the instruction to go back to the previous screen has not been input (step S17: No), the control part 32 causes the display panel 300 to continuously display the content selection screen M3 (step S14).

Figure 14:
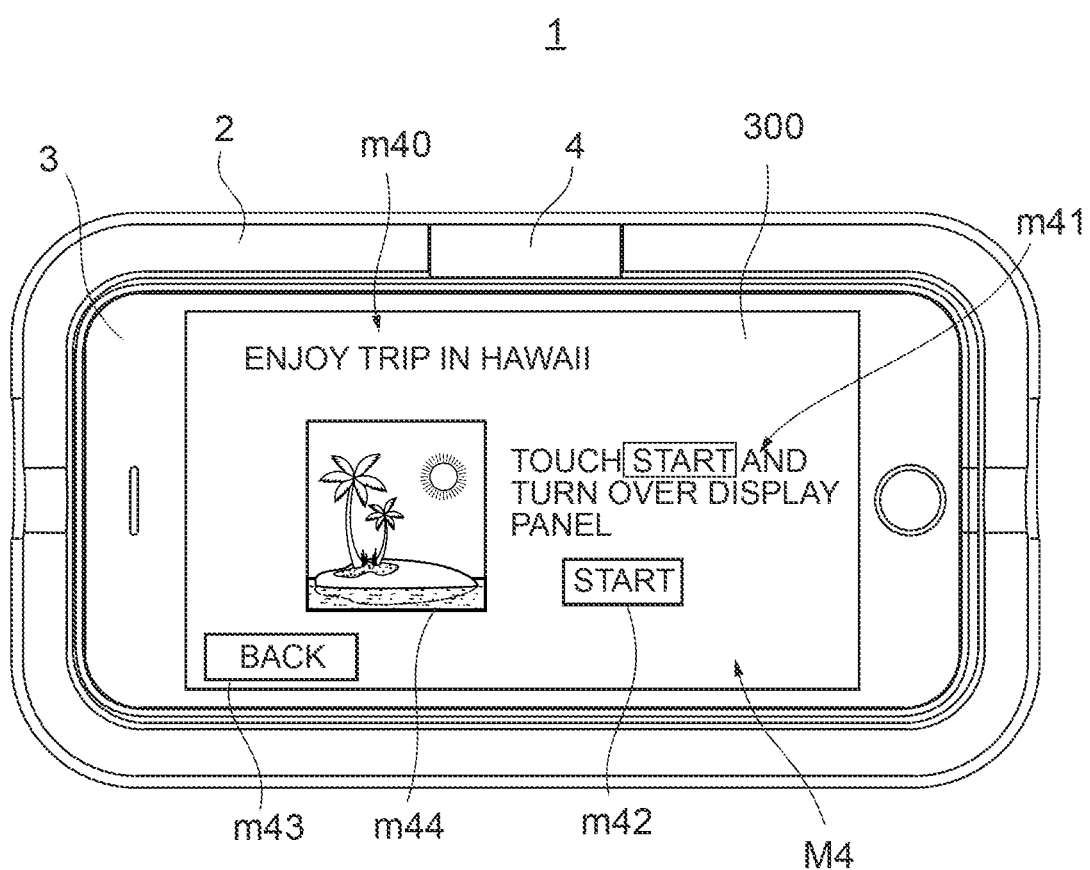
FIG. 14 is a schematic view showing an example of a content start operation screen.

The start operation screen M4 shown in FIG. 14 displays a text message m40 representing the user-selected content (for example, Hawaii as a travel destination), a text message m41 representing an instruction for the user, an icon m42 for inputting an instruction to start the content, and an icon m43 for inputting an instruction to go back to the previous screen. In addition, an enlarged image m44 of the icon m30 which the user touched in the selection screen M3 may also be displayed on the start operation screen M4. When the user wants to start displaying the content, the user touches the icon m42 by following the text message m41 and then reverses the orientation of the display panel 300 from outward to inward.

The control part 32 determines whether a content start operation has been made (step S18). In particular, the control part 32 determines whether a touch operation has been made on the icon m42. If the start operation has been made (step S18: Yes), the control part 32 subsequently determines whether the display panel 300 has been reversed to face inward (step S19). If the display panel 300 has been reversed (step S19: Yes), the control part 32 acquires the image data of the content selected in step S15 from the content data memory part 312 and outputs it to the display part 30 to start displaying the same (step S21). Thereby, an image which can be seen in a stereoscopic view by looking through the two lenses 6 is displayed on the display panel 300 and the user can enjoy viewing the content in virtual reality.

On the other hand, when the start operation has not been made in step S18 (step S18: No), the control part 32 determines whether an instruction to go back to the previous screen has been input (step S20). If the instruction to go back to the previous screen has been input (step S20: Yes), the control part 32 causes the display panel 300 to display the content selection screen M3 shown in FIG. 13 again (step S14). On the other hand, if the instruction to go back to the previous screen has not been input (step S20: No), the control part 32 causes the start operation screen M4 to be continuously displayed (step S16).

In addition, when the display panel 300 has not been reversed in step S19 (step S19: No), the control part 32 prompts the user to perform an operation by causing the display panel 300 to display a message, for example, "Turn over display panel" (step S22). Alternatively, an audio message with a similar content may be generated.

When the content is finished, the control part 32 quits displaying the content (step S23), then the control part 32 determines whether the display panel has been reversed again and is facing outward (step S24). If the display panel 300 has not been reversed (step S24: No), the control part 32 may prompts the user to perform an operation by causing the display panel 300 to display a message, for example, "End. Turn over display panel" (step S25). At this time, an audio message with a similar content may be generated.

On the other hand, if the display panel 300 has been reversed (step S24: Yes), the control part 32 determines whether to quit the operation of the display device 1 (step S26). The control part 32 determines to quit the operation when a particular operation, such as turning off the image display device 3, has been made (step S26: Yes). On the other hand, when it has been determined not to quit the operation (step S26: No), the process goes back to step S10.

As described above, according to the present embodiment, the image display device 3 is connected to the housing 2 such that the display panel 300 is switchable between the state where it faces outward from the housing 2 and the state where it faces inward toward the housing 2 and thus, the display device 1 can be used for various applications without the need to remove the image display device 3 from the housing 2. More particularly, in the state in which the display panel 300 is faced outward, the display device 1 can be used, for example, as a digital signage for advertising, as a device for displaying the operation guide of such display device 1, or alternatively, as an input device through touch operations. In the state where the display panel 300 is faced inward, the display device 1 can be used for displaying, for example, virtual reality content.

Now, in terms of a head-mounted display using a general smartphone, the smartphone is fixed in the housing with a display panel provided to the smartphone facing inward after performing an operation to start displaying an image by utilizing a touch operation function of the display panel. In other words, when the smartphone is fixed in the housing, no operation can be performed on the smartphone. For this reason, the user has to remove the smartphone from the housing each time the user performs an operation, such as selecting an image to be displayed or starting the image display and thus, this is time consuming and cumbersome in terms of handling. According to the present embodiment, however, as described above, in a display device where a display panel can be observed through built-in lenses, the display device can be easily handled without any trouble when performing various operations.

In addition, according to the present embodiment, a general-purpose device having a memory part 31 and a control part 32 embedded therein, such as a smartphone, is used as the image display device 3 and thus, images can be displayed without using external equipment, such as a personal computer or the like.

In such case, any user who is familiar with a smartphone or the like can easily operate the display device 1. Therefore, even if the display device 1 is placed in the front of a store, a store customer him/herself can perform operations without help from a store staff member and can enjoy the virtual reality content.

Moreover, according to the present embodiment, a user can more easily understand the operation method of the display device 1 by looking at the display panel 300 faced outward of the housing 2 while holding the display device 1 in his/her hand. Therefore, the store staff member no longer needs to explain the operation method to individual customers, and this allows operational efficiency at the store to be improved.

Additionally, according to the present embodiment, the control part 32 determines whether the display panel 300 is reversed from outward-facing to inward-facing and the content display starts if it is determined that the reverse has been made and thus, the content display starts at a timing appropriate for the user as well. More specifically, the situations can be prevented where the content display starts when the user is having trouble with reversing the display panel 300, or alternatively, where despite the display panel 300 being reversed and the user being ready to view the content, the display does not start.

It should be noted that, in the above-described embodiment, after the start operation is made in step S18, when a predetermined time elapses after the start operation has been made without determining whether the display panel 300 has been reversed (see step S19), this may be used as a trigger to start displaying the content selected in step S15 (see step S21). In this case, the message display in step S22 is skipped. Similarly, also after the control part 32 quits the content display in step S23, the message display in step S25 may be directly performed without determining whether the display panel 300 has been reversed (see step S24). In these cases, the load on the control part 32 can be made lighter.

First Variation

Figure 15:
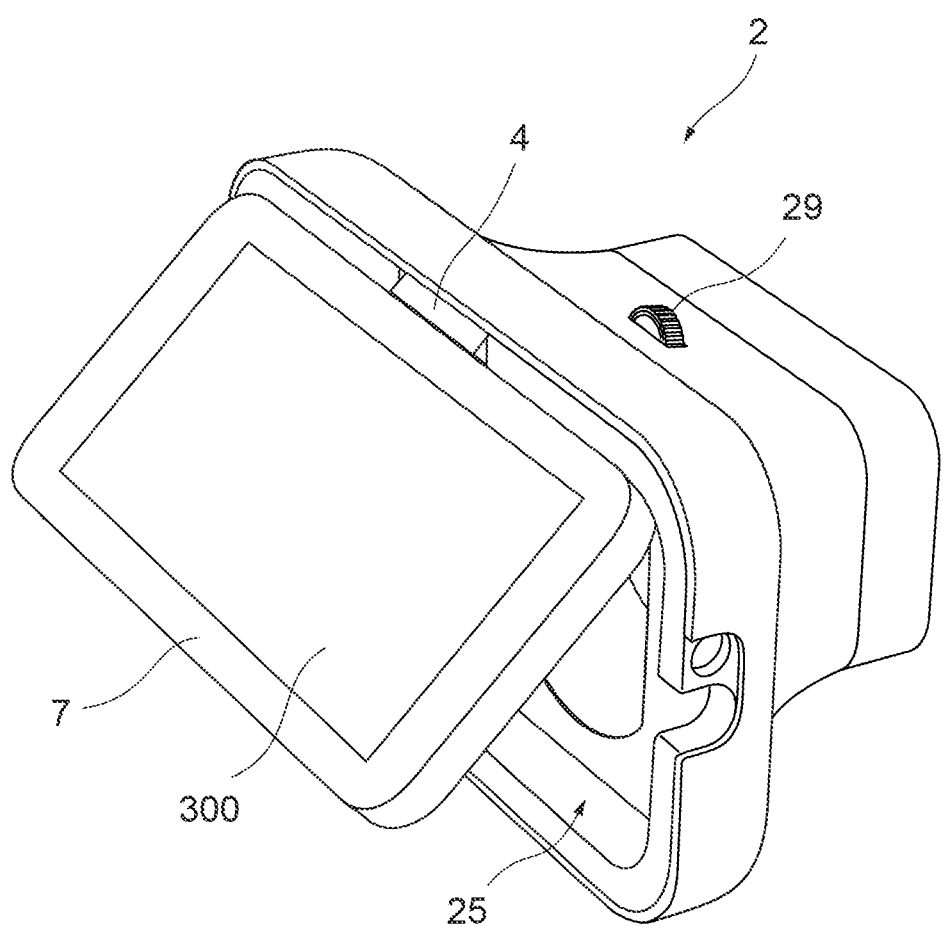
FIG. 15 is a perspective view showing a display device according to a first variation of the present embodiment.
Figure 16:
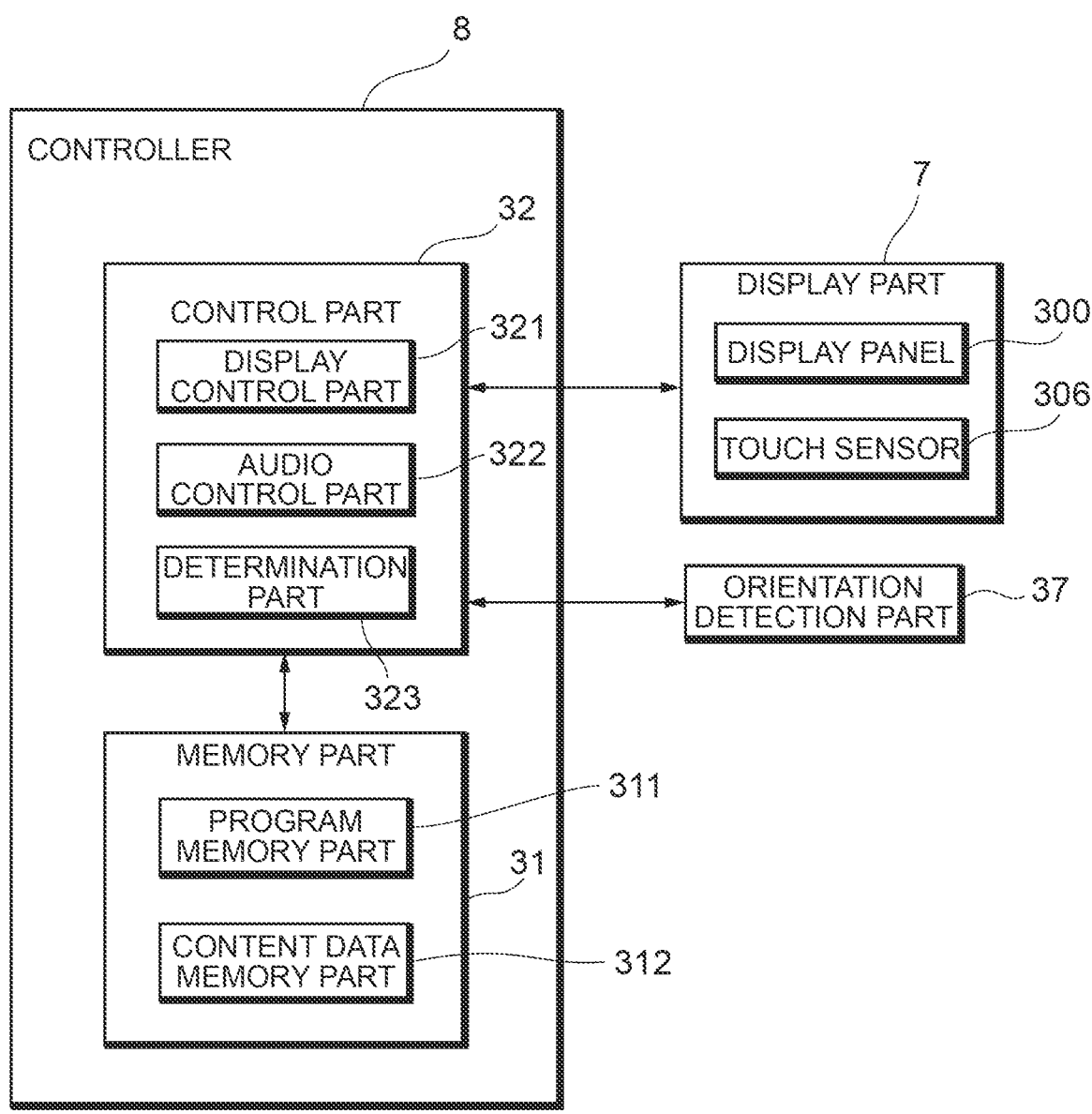
FIG. 16 is a block diagram showing the schematic functional configuration of the display device shown in FIG. 15.

FIG. 15 is a perspective view showing a display device according to a first variation of the above-described embodiment. FIG. 16 is a block diagram showing a schematic functional configuration of such display device. As shown in FIGS. 15 and 16, the display device 1A according to the first variation is provided with: a housing 2; a display part 7 including a display panel 300 and a touch sensor 306; and a controller 8 embedded in the housing 2. The display part 7 is connected to the housing 2 by means of a connection part 4 such that it is switchable between the state in which the display panel 300 faces outward from the housing and the state in which the display panel 300 faces inward toward the housing 2. It should be noted that the configurations of the housing 2 and the connection part 4 are the same as those of the above-described embodiment. FIG. 15 shows the state in the process of switching the orientation of the display part 7 and thus, shows the state in which the display part 7 is partially pulled out from the concave part 25 of the housing 2.

As shown in FIG. 16, the controller 8 is provided with a memory part 31 and a control part 32. The configurations and operations of the memory part 31 and the control part 32 are similar to those of the above-described embodiment (see FIG. 9). In addition, as with the above-described embodiment, a speaker 33, a motion detection part 34, an imaging part 35 or a light detector, or a communication part 36 may further be provided to the display device 1A. Among these, if the motion detection part 34, or the imaging part 35 or the light detector is used for the orientation determination of the display panel 300, this may be provided on the display part 7 side. The speaker 33 and the communication part 36 may be provided either on the housing 2 side or the display part 7 side.

As with the above-described embodiment, in the first variation, the orientation determination of the display panel 300 may be performed based on the rotational movement of the display part 7 detected by the motion detection part 34 or may be performed based on the light amount of the light detected by the imaging part 35 or the light detector. Alternatively, a switch may be provided in the concave part 25, which outputs a different signal depending on the state of the display part 7 (i.e., the orientation of the display panel 300) when the display part 7 is placed in the concave part 25 of the housing 2, and a determination part 323 may determine the orientation of the display panel 300 based on the output signal from this switch.

Second Variation

The controller 8 is embedded in the housing 2 in the above-described first variation; however, this controller 8 may be external to the housing 2. In this case, transmission/reception of image data and control signals, or the like, between the display part 7 and the controller 8 may be performed in a wired manner via communication cables or by wireless communication based on standards such as Wi-Fi (Wireless Fidelity), Bluetooth® or the like.

Third Variation

The image display device 3 or the display part 7 is manually rotated when switching the orientation of the display panel 300 in the above-described embodiment and the first and second variations; however, a drive part, such as a motor or the like, may be provided on the connection part 4 and the image display device 3 or the display part 7 may be automatically rotated through electrical control. In such case, a switch for activating the drive part may be provided on the housing 2 or the drive part may be activated by a predetermined operation on the screen displayed on the display panel 300. For example, the drive part may be activated and the image display device 3 may be rotated to orient the display panel 300 inward by the user touching the icon m42 in the start operation screen M4 shown in FIG. 14.

Fourth Variation

The image display device 3 or the display part 7 retained in the retention part 5 is placed in the concave part 25 of the housing 2 in the above-described embodiment and the first and second variations; however, the image display device 3 or the display part 7 do not necessarily have to be placed in the concave part 25. For example, the dimension of the end face of the concave part 25 may be made smaller than the dimension of the main surface of the image display device 3 and the display part 30 of the image display device 3 may be made to abut the end face of the concave part 25. In short, it is sufficient as long as the concave part 25 may be occluded by the image display device 3 or the display part 7.

Fifth Variation

The first state in which the display panel 300 is exposed to the exterior of the housing 2 and the second state in which the display panel 300 is facing toward the interior of the housing 2 are switched by reversing the image display device 3 retained in the retention part 5 with respect to the housing 2 in the above-described embodiment. However, the method of switching between the first state and the second state is not limited thereto.

Figure 17:
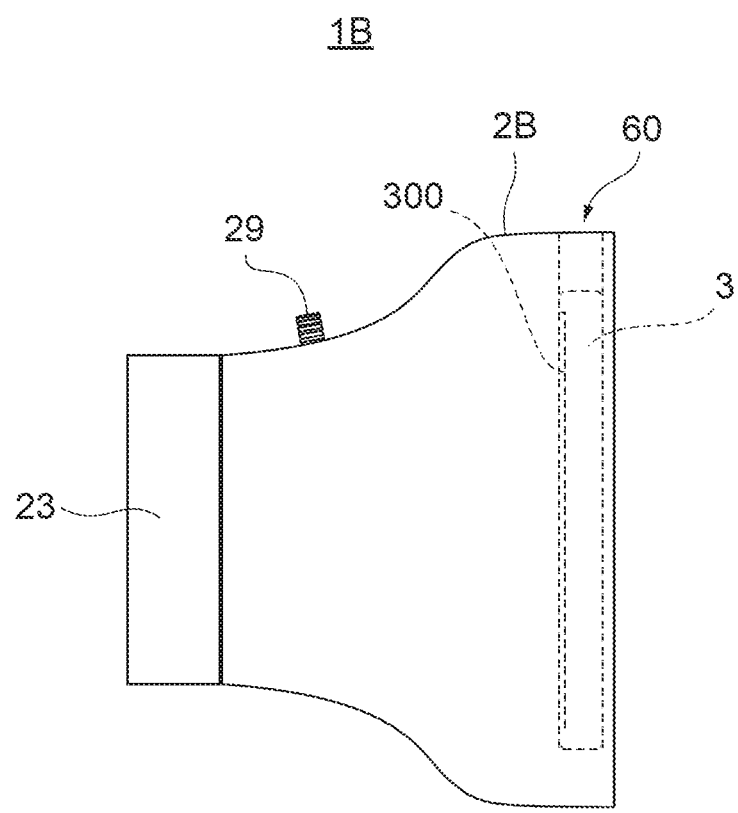
FIG. 17 is a schematic view showing a display device according to a fifth variation of the embodiment.
Figure 18:
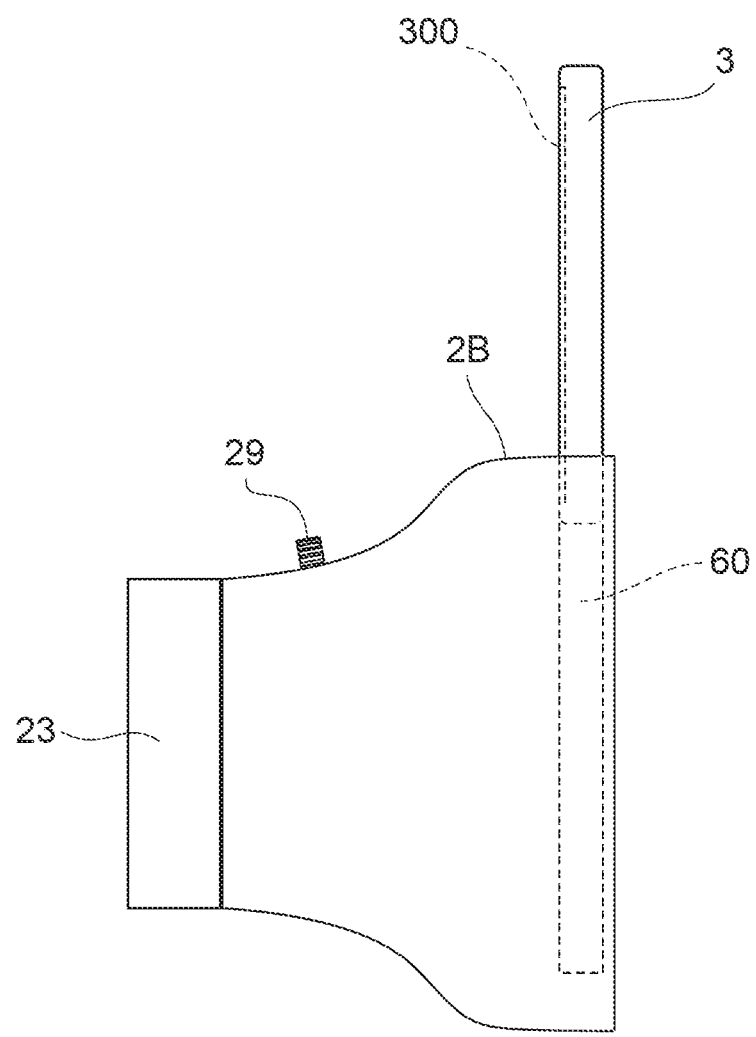
FIG. 18 is another schematic view showing the display device according to the fifth variation of the embodiment.

Each of FIGS. 17 and 18 is a schematic view showing a display device according to a fifth variation of the above-described embodiment. As an example of the method for switching the states of the display panel 300, a slot 60 may be provided, into which the image display device 3 can be inserted, on the housing 2B of the display device 1B, and the image display device 3 is slidably inserted into and extracted from the slot 60. It should be noted that the structure of the housing 29 is similar to that of the housing 2 in the above-described embodiment, except for the slot 60 and the mechanism for inserting/extracting the image display device 3. As shown in FIG. 17, when the image display device 3 is inserted into the slot 60, the display panel 300 faces toward the interior of the housing 2B which enables a user to enjoy viewing the 3D images via the housing 2B. In contrast, as shown in FIG. 18, when the image display device 3 is extracted from the slot 60, the display panel 300 is exposed to the exterior of the housing 2B which enables the user to perform a touch operation on the display panel 300 or to enjoy viewing the 2D images.

The mechanism for extracting the image display device 3 may be, for example, a pop-up mechanism using a spring. The operation at the time of extracting the image display device 3 may involve pushing in the image display device 3 once in the direction of inserting the image display device 3 or pressing a switch that is specifically provided. Alternatively, a motor may be used to insert/extract the image display device 3. According to the fifth variation, the user can switch the display panel 300 between the first state and the second state with a simple operation.

Sixth Variation

Figure 19:
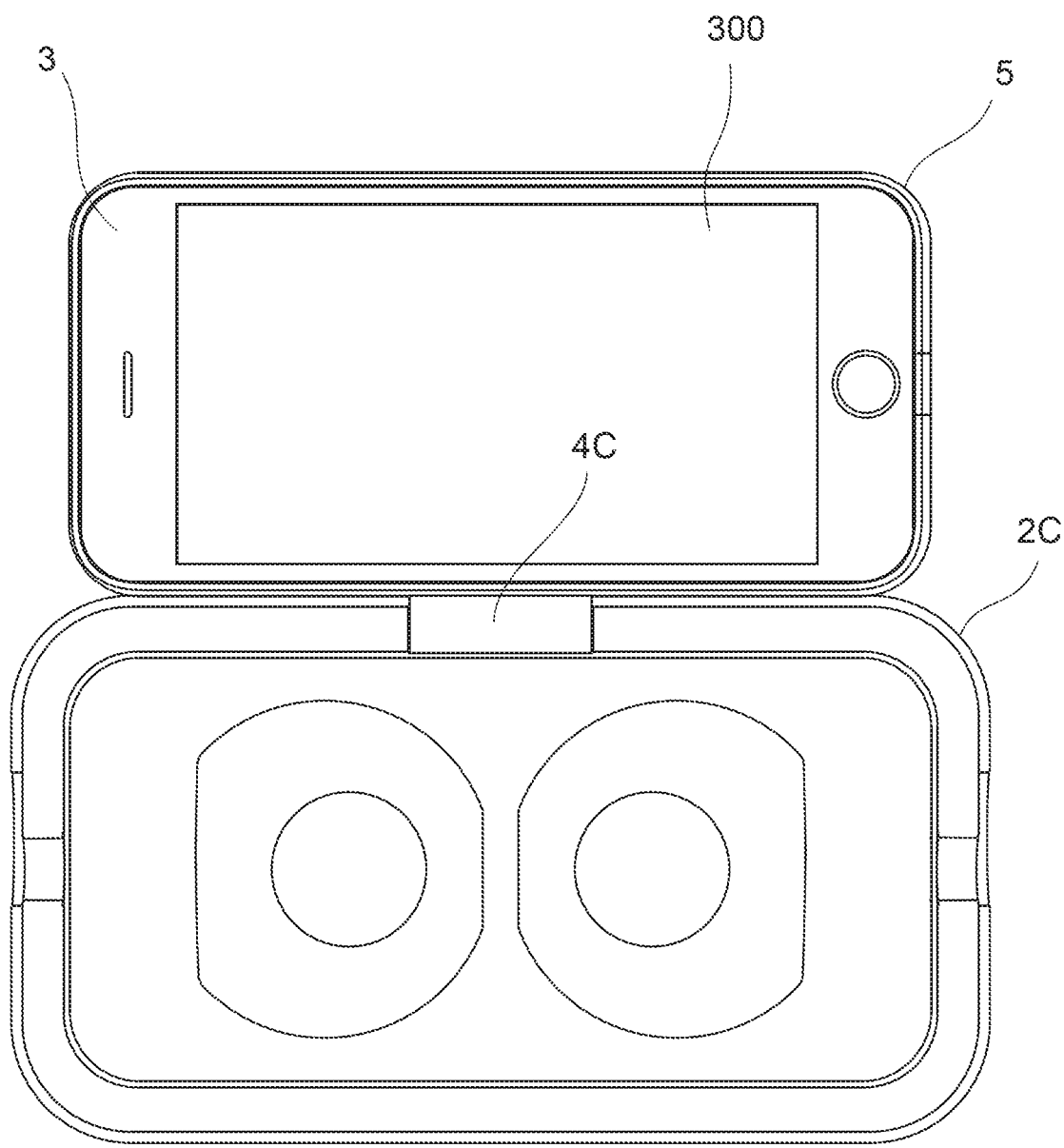
FIG. 19 is a schematic view showing a display device according to a sixth variation of the embodiment.
Figure 20:
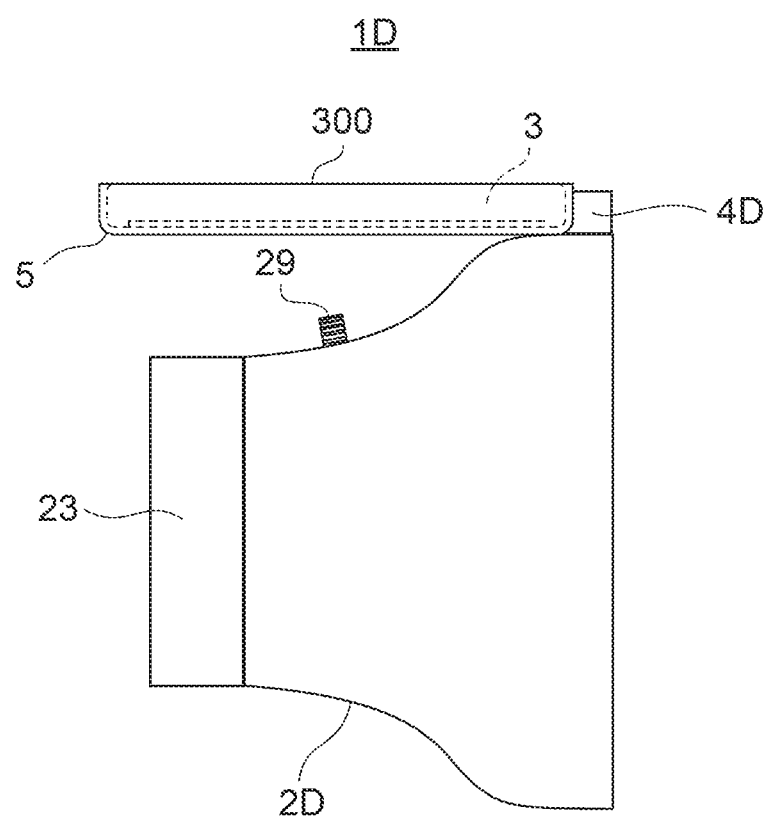
FIG. 20 is another schematic view showing the display device according to the sixth variation of the embodiment.

Each of FIGS. 19 and 20 is a schematic view showing a display device according to a sixth variation of the above-described embodiment of the present invention. As another example of the method for switching the display panel 300 between the first state and the second state, the image display device 3 retained in the retention part 5 may be opened/closed with respect to the housing 2C, 2D of the display device 1C, 1D. It should be noted that the structure of the housing 2C, 2D is similar to that of the housing 2 in the above-described embodiment, except for the structure of the connection part 4C, 4D.

For example, as shown in FIG. 19, the retention part 5 is connected to the housing 2C by means of the connection part 4C configured by a single-axis hinge. In such case, the display panel 300 is exposed to the exterior of the housing 2C by opening the image display device 3 by approximately 180° with respect to the housing 2C, and the user then can perform a touch operation on the display panel 300 or enjoy viewing 2D images, or the like. In contrast, by closing the image display device 3, the display panel 300 faces toward the interior of the housing 2C, and the user then can enjoy viewing 3D images through the housing 2C.

The angle to which the image display device 3 is opened is not limited to approximately 180° and, as shown in FIG. 20, the connection part 4D may be configured such that the image display device 3 may be opened by up to approximately 270° with respect to the housing 2D. The direction in which the image display device 3 is opened is not limited to the direction orthogonal to the longitudinal direction of the image display device 3 as shown in FIGS. 19 and 20. For example, the image display device 3 may be opened in the direction orthogonal to the lateral direction by providing the connection part in the lateral direction of the housing. Furthermore, the image display device 3 may be automatically opened/closed through electrical control by providing a drive part, such as a motor or the like, on the connection part 4C, 4D. According to the sixth variation as well, the user can switch the display panel 300 between the first state and the second state with a simple operation.

The heretofore-described invention is not limited to the above-described embodiment and the first to sixth variations, and various inventions can be made by appropriately combining a plurality of components disclosed in the above-described embodiment and the first to sixth variations. For example, such inventions may be made by excluding some components from all of the components indicated in the above-described embodiment and the first to sixth variations or by appropriately combining the components indicated in the above-described embodiment and the first to sixth variations.

Further advantages and modifications may be easily conceived of by those skilled in the art. Accordingly, a wider aspect of the present invention is not limited to the particular details and representative embodiment described herein. Accordingly, various modifications can be made to the present invention without departing from the spirit or scope of the general idea of the invention defined by the appended claims and equivalents thereof.

What is claimed is:

1. A display device comprising:
   a housing that has a space formed therein, the space opening at two end faces that are opposed to each other;
   two lenses that are placed in the space; and
   a display part that has a display panel and is placed on the side of one of the two end faces,
   wherein the display part can be switched between a first state in which the display panel is exposed to the exterior of the housing and a second state in which the display panel faces toward the interior of the housing by reversing the orientation of the display part with respect to the housing;
   wherein, in the first state, the display panel is configured for at least one of allowing a user to view a content displayed on the display panel from an outward of the housing and allowing the user to operate the display device through touch operations from the outward of the housing; and
   wherein, in the second state, the display panel is configured for allowing the user to view a content displayed on the display panel through the two lenses.

2. The display device according to claim 1, wherein the display part causes the display panel to display a two-dimensional image when in the first state.

3. The display device according to claim 1, wherein the display part causes the display panel to display an image that allows stereoscopic viewing by looking through the two lenses when in the second state.

4. The display device according to claim 3, further comprising:
   a control part that causes the display panel to display an instruction to switch the display part to the second state when the display part is in the first state and before causing the display panel to display the image.

5. The display device according to claim 3, further comprising:
   a control part that causes the display panel to display an instruction to switch the display part to the first state when displaying of the image is finished.

6. The display device according to claim 1, wherein the display part has a touch sensor that outputs a signal according to an operation made on the display panel, and
   wherein the display device further comprises:
   a control part that causes the display panel to display an operation screen that accepts an operation input that is detectable by the touch sensor, when the display part is in the first state.

7. The display device according to claim 1, further comprising:
   a memory part that stores image data, and
   wherein the display part causes the display panel to display an image which is based on the image data acquired from the memory part.

8. The display device according to claim 1, further comprising:
   a communication part that performs transmission/reception of data with a communication network, and
   wherein the display part causes the display panel to display an image which is based on the image data acquired via the communication part.

9. The display device according to claim 1, further comprising:
   a determination part that determines the state of the display panel, and wherein the display part causes the display panel to display an image according to a determination result of the determination part.

10. The display device according to claim 1, further comprising:
a connection part that connects the display part to the housing such that the display part can be switched between the first state and the second state; and
a drive part that drives the connection part.

11. The display device according to claim 1, wherein the display part is connected to the housing via a biaxial hinge.

12. The display device according to claim 1, wherein an opening on the side of the one end face of the housing is capable of being occluded by the display part when in the second state.

13. A display device accessory comprising:
a housing that has a space formed therein, the space opening at two end faces that are opposed to each other;
two lenses that are placed in the space; and
a connection part that is placed on the side of one of the two end faces and that directly or indirectly connects an image display device to the housing, the image display device having a display panel that is capable of displaying an image,
wherein, while the image display device is directly or indirectly connected to the housing by the connection part, a first state in which the display panel is exposed to the exterior of the housing and a second state in which the display panel faces toward the interior of the housing can be switched by reversing the orientation of the image display device with respect to the housing;
wherein, in the first state, the display panel is configured for at least one of allowing a user to view a content displayed on the display panel from an outward of the housing and allowing the user to operate the image display device through touch operations from the outward of the housing; and
wherein, in the second state, the display panel is configured to allow the user to view a content displayed on the display panel through the two lenses.

14. The display device accessory according to claim 13, further comprising:
a retention part that is capable of retaining the image display device in a state in which the display panel is exposed, and
wherein the connection part connects the image display device to the housing via the retention part.

15. The display device accessory according to claim 13, wherein the connection part includes a biaxial hinge.

16. The display device accessory according to claim 13, wherein an opening on the side of the one end face of the housing is capable of being occluded by the image display device, when in the second state.

* * * * *